United States Patent
Takayama et al.

[11] Patent Number: 6,015,775
[45] Date of Patent: Jan. 18, 2000

[54] SELF-LUBRICATING SINTERED SLIDING MATERIAL AND METHOD FOR MANUFACTURING THE SAME

[75] Inventors: Takemori Takayama; Yoshikiyo Tanaka, both of Osaka, Japan

[73] Assignee: Komatsu Ltd., Tokyo, Japan

[21] Appl. No.: 09/011,639

[22] PCT Filed: Aug. 7, 1996

[86] PCT No.: PCT/JP96/02272

§ 371 Date: Feb. 4, 1998

§ 102(e) Date: Feb. 4, 1998

[87] PCT Pub. No.: WO97/05980

PCT Pub. Date: Feb. 20, 1997

[30] Foreign Application Priority Data

Aug. 8, 1995  [JP]  Japan ..................................... 7-224746

[51] Int. Cl.[7] .......................... C10M 103/00; B22F 7/02; B22F 3/24; C22C 33/02

[52] U.S. Cl. .......................... 508/103; 508/104; 508/105; 508/108; 428/615; 428/621; 427/405; 427/419.1

[58] Field of Search .................... 508/105, 104, 508/103, 108; 428/615, 621; 427/405, 419.1

[56] References Cited

U.S. PATENT DOCUMENTS

| | | | |
|---|---|---|---|
| 1,054,265 | 1/1913 | Baekeland | 508/105 |
| 2,214,104 | 9/1940 | Hildabolt et al. | 508/105 |
| 2,700,623 | 1/1955 | Hall | 508/105 |
| 3,115,395 | 12/1963 | Putt et al. | 508/105 |
| 3,297,571 | 1/1967 | Bonis | 508/104 |
| 4,096,075 | 6/1978 | Nakamura | 508/105 |
| 4,678,818 | 7/1987 | Nakagawa et al. | 508/105 |
| 5,415,791 | 5/1995 | Chou et al. | 508/105 |
| 5,525,246 | 6/1996 | Kamiya et al. | 508/105 |
| 5,732,322 | 3/1998 | Nakamaru et al. | 508/105 |

FOREIGN PATENT DOCUMENTS

| | | |
|---|---|---|
| 58-157951 | 9/1983 | Japan . |
| 64-56846 | 3/1989 | Japan . |
| 2-38540 | 2/1990 | Japan . |
| 3-219057 | 9/1991 | Japan . |
| 6-279959 | 10/1994 | Japan . |
| 6-299284 | 10/1994 | Japan . |

*Primary Examiner*—Margaret Medley
*Attorney, Agent, or Firm*—Armstrong, Westerman, Hattori, McLeland & Naughton

[57] ABSTRACT

A self-lubricating sintered sliding member and its producing method, the member having excellent seizing resistance and wear resistance even in offset load and high load applications.

The self-lubricating sintered sliding member is composed of an iron-family metal substrate and a sintered contact layer that is formed on a sliding side of the iron-family metal substrate and made from a sintered contact material containing an iron-family material. The sintered contact layer has, on a surface thereof, protrusions formed from solid lubricant particles including graphite. A solid lubricant layer is laid over the surface of the sintered contact layer where the protrusions are formed.

23 Claims, 9 Drawing Sheets

FIG.1(a)

3
2 SECOND SINTERED LAYER
1 SINTERED CONTACT LAYER

FIG.1(b)

SHAFT
1
SOLID LUBRICANT  5 RECESS  SINTERED CONTACT LAYER

SELF-LUBRICATING SINTERED SLIDING MATERIAL AND METHOD FOR MANUFACTURING THE SAME

TECHNICAL FIELD

The present invention relates to a self-lubricating sintered sliding member and its producing method. More particularly, the invention relates to a self-lubricating sintered sliding member composed of an iron-family metal substrate and a sintered contact layer that is formed on a sliding side of the iron-family metal substrate and made from a sintered contact material containing an iron-family material, and its producing method.

BACKGROUND ART

It is known to use self-lubricating sintered sliding members in an unlubricated machine as bushings. One example of such bushings comprises a copper or stainless steel parent layer into which a solid lubricant such as graphite, molybdenum disulfide or tungsten disulfide is mixed (e.g., SL alloys produced by TOSHIBA TUNGALOY CO., LTD.). An inexpensive self-lubricating sintered sliding member is currently available, which is formed from a special-type plastic material containing a solid lubricant. Previously, the inventors have proposed self-lubricating sintered sliding members capable of sustaining high load in Japanese Patent Applications No. 63-190994 (1988) and No. 2-14380 (1990). The sliding members disclosed in these applications are formed by mixing and dispersing a solid lubricant such as graphite into a parent material made from a sintered iron-family material.

The self-lubricating sintered sliding member made from plastic material, however, has the disadvantage that when the pressure on the sliding surface exceeds 200 kg/cm$^2$, "permanent set" occurs, resulting in a considerably short wear life. The self-lubricating sintered sliding members of other types also reveal the same problem when the pressure on the sliding surface exceeds 500 kg/cm$^2$.

There has been proposed a double-layer bushing designed for use in high load applications where the bushing is subjected to an offset load or peak load. This bushing comprises (i) an inner layer having a depth of about 1 mm from the cylindrical inner surface and made from an iron-family, self-lubricating contact material reinforced and hardened by heat treatment and (ii) an outer layer enclosing the inner layer and made from an ordinary, high-strength, iron-family, sintered material. This double-layer bushing suffers from the problem that if it is subjected to an excessive offset load, abnormal wear would occur or micro cracks would be created in such a fashion that the solid lubricant particles dispersing within the parent layer made from the sintered iron-family material or the regions around them are linked to one another by the cracks.

The tissues of the above prior art self-lubricating sintered sliding members were observed after their sliding movement and it was found that the following phenomenons (1) to (5) were associated with the problems encountered by them.

(1) The solid lubricant particles become close to or come in contact with one another because of the segregation of the solid lubricant particles and the flattening of them caused by pressurization during press molding, so that cracking starts from the most brittle parts.

(2) In the case where graphite is mixed into a sintered parent layer made from an iron-family material for example, a brittle carbide such as cementite is created in the vicinity of graphite and in the grain boundary of the sintered parent layer by the reaction during sintering. This weakens the sintered parent layer so that the bushing becomes more susceptible to distraction and abnormal wear.

(3) The occurrence of the phenomenon (1) may be restricted to some extent by increasing the particle size of the solid lubricant particles and the distance between them. However, the lubricant particles are significantly flattened by the pressurization during press molding and the metal particles of the parent layer bite into the layer, causing notch-like configuration, so that the bushing is subjected to stress concentration and, in consequence, distraction.

(4) In the early period of abnormal wear caused for the above reasons, the bushing seems to function without making troubles and abnormal noise, because a large amount of wear chip powder including a solid lubricant is produced. However, the lubricating effect of the wear chip powder decreases from a certain moment, starting abnormal noise generation.

(5) Since a solid lubricant cannot be used inordinately in view of strength, the conformability of the bushing cannot be obtained in the initial stage of operation. Therefore, there is a need for sufficient machine warm-up in order to prevent abnormal noise generation, seizure which would occur at the beginning of operation and the like. Insufficient use of a solid lubricant also causes the adhesion and galling of the bushing relative to the member over which the bushing slides.

One attempt to solve the above problems (1) to (3) which would arise when the parent layer is made from a sintered material is such that holes or grooves are formed in an ingot material by machining and these holes are filled with a solid lubricant. Bushings formed by this method are commercially available (e.g., bushings under the code of S0#50 SP2 produced by SANKYO OILLESS INC.). However, such bushings are costly since a number of holes or grooves made by machining are required and leave the problems (4) and (5) unsolved. In addition, seizure and abnormal wear are likely to occur when the rocking angle of the bushings becomes small, unless the pitch of the solid-lubricant-embedding holes is reduced. To solve this problem requires formation of more embedding holes, resulting in higher cost.

The present invention is directed to overcoming the above problems and therefore one of the objects of the invention is to provide a self-lubricating sintered sliding member and its producing method, the member having the ability of exerting superior resistance to seizure and wear even in offset load and high load applications.

DISCLOSURE OF THE INVENTION

According to a first aspect of the invention, the above objects can be achieved by a self-lubricating sintered sliding member comprising an iron-family metal substrate and a sintered contact layer that is formed on a sliding side of the iron-family metal substrate and made from a sintered contact material containing an iron-family material, the sintered contact layer having, on a surface thereof, protrusions formed from solid lubricant particles, the surface of the sintered contact layer where the protrusions are formed being covered with a solid lubricant layer.

In the self-lubricating sintered sliding member having the first feature of the invention, protrusions are formed from solid lubricant particles on a surface of the sintered contact layer and only the solid lubricant particles constituting the protrusions come in contact with a member relative to which the sliding member slides. With this arrangement, the sliding member exerts initial conformability and excellent lubricity. In addition, since the solid lubricant layer laid over the sintered contact layer is caught by the protrusions and therefore hardly peels off during a sliding movement of the sliding member, the excellent lubricity and initial conformability of the self-lubricating sintered sliding member can be ensured even in offset load and high load applications. In other words, with the provision of the solid lubricant layer, superior seizing resistance and wear resistance can be achieved.

In the invention, the protrusions may be formed by making the solid lubricant particles contained in the sintered contact layer project from the surface of the sintered contact layer. It is very reasonable to form the protrusions from the solid lubricant particles because the solid lubricant is already contained in the sintered contact layer.

For forming the protrusions from the solid lubricant particles, the preferable particle diameter of the solid lubricant particles is 0.1 to 3.0 mm and the sintered contact layer desirably contains the solid lubricant particles in amounts of 15 to 50% by volume. If the particle diameter is smaller than 0.1 mm, the effect of catching the solid lubricant layer cannot be achieved, whereas if the particle diameter exceeds 3.0 mm, the solid lubricant particles are more likely to drop from the sintered contact layer. If the amount of the solid lubricant particles is less than 15% by volume, satisfactory lubricity cannot be achieved, whereas if the amount of the solid lubricant exceeds 50% by volume, the self-lubricating sintered sliding member wears to a considerable extent.

Examples of the solid lubricant particles include graphite, BN, $WS_2$, $MoS_2$, and $CaF_2$, and one or more lubricants may be selected from these known solid lubricants.

In the self-lubricating sintered sliding member of the invention, the solid lubricant layer contains one or more known solid lubricants selected from the group consisting of graphite, BN, $WS_2$, $MoS_2$ and $CaF_2$. The solid lubricant layer may contain a metal powder for reducing the adhesion of the layer relative to iron and/or an organic binder, in addition to the above known solid lubricant(s). The metal powder for reducing the adhesion of the layer relative to iron may be a non-ferrous metal powder which has weak adhesion in relation to iron such as Cu, Zn, Pb, Bi, Sb, W and Mo. The organic binder is added for the purpose of achieving the effects of a thickener and improving the applicability of the layer to the sliding surface. Examples of the organic binder include grease, nylon and phenol resin.

According to a second aspect of the invention, there is provided a self-lubricating sintered sliding member comprising an iron-family metal substrate and a sintered contact layer formed on the iron-family metal substrate, the sintered contact layer having recesses formed on a surface thereof, the surfaces of the sintered contact layer and the recesses being covered with a solid lubricant layer.

In the self-lubricating sintered sliding member having the second feature of the invention, recesses are formed on a surface of the sintered contact layer and the solid lubricant layer is caught by the recesses from its underside (i.e., anchoring effect), so that the solid lubricant layer hardly peels off during a sliding movement of the self-lubricating sintered sliding member, which permits the sliding member to exert excellent initial conformability and lubricity even in offset load and high load applications.

The recesses may be holes formed by removing solid lubricant particles contained in the surface of the sintered contact layer. Making such recesses by machining takes a lot of labor. In contrast with the machining process, the formation of the recesses by removing the solid lubricant particles is easy and economical.

The preferable particle diameter of the solid lubricant particles is 0.1 to 3.0 mm and the sintered contact layer desirably contains the solid lubricant particles in amounts of 15 to 50% by volume. If the particle diameter is smaller than 0.1 mm, the recesses to be formed are so small in size that the anchoring effect cannot be expected. If the particle diameter exceeds 3.0 mm, the sintered contact layer is more likely to drop off.

In the invention, examples of the solid lubricant particles include graphite, BN, $WS_2$, $MoS_2$, and $CaF_2$, and one or more lubricants may be selected from these known solid lubricants.

The sintered contact material preferably contains a copper-family material in addition to an iron-family material. The use of the copper-family material increases the compactness and accordingly contracting amount of the sintered contact layer, so that the solid lubricant particles can project more easily from the sintered contact layer, realizing easy formation of the protrusions or easy formation of the recesses by removing the protrusions.

In the invention, the preferable amount of the copper-family material to be added is 10 to 80% by volume. The use of the copper-family material in an amount of 10% by volume or more prevents the reaction between graphite serving as the solid lubricant and the iron-family material during sintering so that the precipitation of a brittle phase such as cementite is effectively prevented. If the amount of the copper-family material is less than 10% by volume, the sintered contact layer will be less densified. On the other hand, if the amount exceeds 80% by volume, the particles of the iron-family material contained in the sintered contact layer are substantially completely enclosed by the copper-family material so that the strength and sliding properties inherent to the iron-family material cannot be achieved.

Preferably, the sintered contact material further includes carbon. The presence of carbon improves the strength of the sintered contact layer.

It is preferable that the sintered contact material contain 2.0 to 20.0 wt % of Ni and 0.5 to 10.0 wt % of one or more elements selected from the group consisting of Ti, Si, Al, Fe, Co, Cr, Zr and Sn. The reason for adding the above element (s) is to obtain high-load resistance and to make the sintering temperatures of the sintered contact layer and the iron-family metal substrate close to each other.

The sintered contact layer is preferably densified to a degree of 90% or more. If the degree of densification is lower than 90%, necessary strength cannot be obtained.

In order to obtain high compactness, it is preferable that the sintered contact material should contain an iron-family material ground into a fine powder of 250 mesh or less.

In the invention, the sintered contact layer is preferably joined to the sliding side of the iron-family metal substrate by diffusion bonding. By diffusion bonding, the sintered contact layer can be firmly bonded to the iron-family metal substrate. It is conceivable that a steel pipe may be used as the iron-family metal substrate and when an iron-family sintered material is used, the definition of "diffusion bonding" disclosed herein covers the process wherein the iron-family sintered material is molded together with the sintered contact layer into a double-layered member and then the double-layered member is sintered.

According to a third aspect of the invention, there is provided a method of producing a self-lubricating sintered sliding member composed of an iron-family metal substrate and a sintered contact layer that is formed on a sliding side of the iron-family metal substrate and made from a sintered contact material containing an iron-family material, the sintered contact layer having a solid lubricant layer formed on a surface thereof, the method comprising the steps of:

forming protrusions on a surface of the sintered contact layer, and forming the solid lubricant layer on the surface of the sintered contact layer where the protrusions are formed.

With the self-lubricating sintered sliding member producing method having the third feature of the invention, a self-lubricating sintered sliding member highly resistant to seizure and wear can be formed, in which the sintered contact layer hardly peels off.

In the self-lubricating sintered sliding member producing method of the invention, a copper-family material and solid lubricant particles are mixed into a sintered contact material containing an iron-family material and the sintered contact material mixed with these materials is sintered and contracted, whereby the solid lubricant particles can be projected from the surface of the sintered contact layer to form the protrusions. Since the solid lubricant is already mixed into the sintered contact material, it is very reasonable to form the protrusions from the particles of the solid lubricant.

Preferably, the particle diameter of the solid lubricant particles used in this method ranges from 0.1 to 3.0 mm and the sintered contact layer contains 15 to 50% by volume of the solid lubricant particles, for the reasons explained earlier in the description of the self-lubricating sintered sliding member having the first feature of the invention.

According to a forth aspect of the invention, there is provided a method of producing a self-lubricating sintered sliding member composed of an iron-family metal substrate and a sintered contact layer that is formed on a sliding side of the iron-family metal substrate and made from a sintered contact material containing an iron-family material, the sintered contact layer having a solid lubricant layer formed on a surface thereof, the method comprising the steps of:

forming recesses on a surface of the sintered contact layer, and forming the solid lubricant layer on the surface of the sintered contact layer where the recesses are formed.

With the self-lubricating sintered sliding member producing method having the forth feature of the invention, a self-lubricating sintered sliding member highly resistant to seizure and wear can be formed, in which the sintered contact layer hardly peels off by virtue of the anchoring effect.

In the self-lubricating sintered sliding member producing method of the invention, solid lubricant particles are mixed into a sintered contact material containing an iron-family material and after the sintered contact material mixed with the particles has been sintered, the solid lubricant particles are removed from the surface of the sintered contact layer, thereby forming the recesses. According to this method, the solid lubricant particles for improving the lubricity of the sintered contact layer are utilized in the formation of the recesses, so that a need for machining operation can be eliminated, resulting in easy formation of the recesses. This realizes economical production of a self-lubricating sintered sliding member highly resistant to seizure and wear. For removing the solid lubricant particles from the surface of the sintered contact layer, a method such as sand blasting or shot peening may be utilized.

Preferably, the particle diameter of the solid lubricant particles used in this method ranges from 0.1 to 3.0 mm and the sintered contact layer contains 15 to 50% by volume of the solid lubricant particles, for the reasons explained earlier in the description of the self-lubricating sintered sliding member having the second feature of the invention.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BEST MODE FOR CARRYING OUT THE INVENTION

Referring now to the accompanying drawings, preferred embodiments of the self-lubricating sintered sliding member and its producing method according to the invention will be described.

(Embodiment 1)

Alloy powders (ATOMEL 4600 produced by KOBE STEEL LTD. and ASC300 produced by Höganäs AB), nickel carbonyl (INCO LIMITED., average particle diameter=1 μm), an electrolytic copper powder (CE15 produced by FUKUDA METAL FOIL & POWDER CO., LTD.) and a graphite iron powder (KS6 produced by LONZA LTD.) were mixed to prepare 8 types of powder mixtures having the compositions shown in Table 1. Artificial graphite particles having a particle diameter ranging from 0.3 mm to 2.5 mm were mixed into each of the powder mixtures by amounts of 10% by volume, 20% by volume, 40% by volume and 50% by volume, thereby preparing powders (A). These powders (A) were respectively used for forming the sintered contact layer of the self-lubricating sintered sliding member of this embodiment. It should be noted that the copper component (i.e., electrolytic copper powder) is not necessarily mixed at the stage of the preparation of each power mixture but may be infiltrated during or before sintering of the molded body which has been formed from the powder mixture. The preferable carbon content of the powders (A) ranges from 0.01 to 0.8 wt %. If it exceeds 0.8 wt %, there is a likelihood that a carbide in the form of a network may precipitate in the grain boundary. In order to control hardenability, carburizing hardenability, nitriding hardenability, alloy components such as Ni, Mo, Cr, Mn, V, Ti, Al and Si may be added to the powders (A) in normal amounts. The amount of the artificial graphite particles added to each powder mixture is indicated in percentage by volume in Table 2 (described later).

A ferroalloy powder (300M produced by KOBE STEEL, LTD.), a graphite iron powder (KS6 produced by LONZA LTD.) and an iron phosphide ferroalloy powder (produced by FUKUDA METAL FOIL & POWDER CO., LTD.) were mixed to prepare a powder (B) which was to be used for forming a second sintered layer (iron-family metal substrate) containing Fe, 0.6 wt % C, and 0.5 wt % P.

Figure 1A:
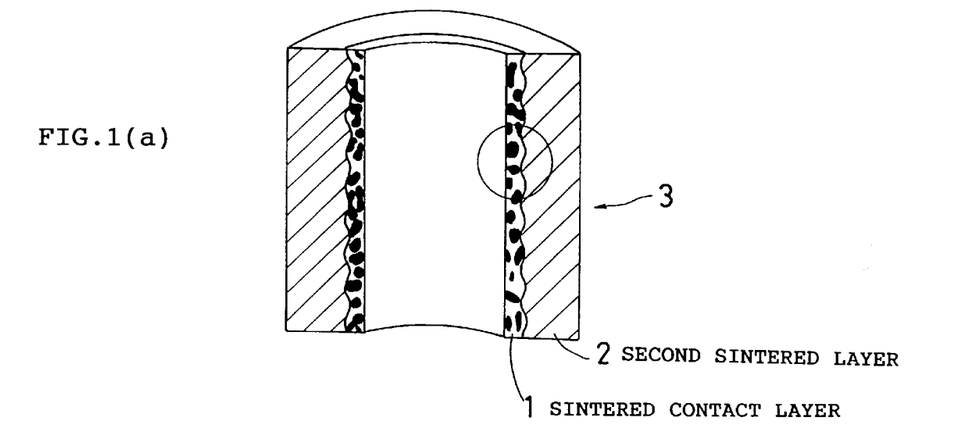
FIGS. 1(a) and 1(b) depicts a cross section of a self-lubricating sintered sliding member according to one embodiment of the invention.

By use of the powder (B), the powders (A) and graphite, molded bodies were formed under a pressure of 4.5 t/cm$^2$ by CIP (cold isostatic pressing). These molded bodies were then sintered at a temperature of 1,100° C. for one hour in a vacuum atmosphere of 10$^{-2}$ torr or less and then quickly cooled by a N$^2$ gas from 950° C., thereby preparing sample bushings 3, each of which is a double-layer cylindrical member composed of the sintered contact layer 1 (inner layer) and the second sintered layer 2 (outer layer) and having a cross section as shown in FIG. 1(a). The details (graphite particle size (mm), the amount of graphite particles (% by volume) etc.) of these sample bushings 3 are shown in Table 2.

TABLE 1

| SAMPLE NO. | C | Ni | Mo | Cu | Fe | PARTICLE SIZE OF Fe |
|---|---|---|---|---|---|---|
| 1 | 0.6 | 2.0 | 0.5 | — | 4600 | −250 MESH |
| 2 | 0.6 | 2.0 | 0.5 | 10.0 | 4600 | −250 |
| 3 | 0.6 | 2.0 | 0.5 | 20.0 | 4600 | −250 |
| 4 | 0.6 | 2.0 | 0.5 | 30.0 | 4600 | −250 |
| 5 | 0.6 | 2.0 | 0.5 | 50.0 | 4600 | −250 |
| 6 | 0.6 | 2.0 | — | 40.0 | ASC300 | −300 |
| 7 | 1.0 | 2.0 | 0.5 | 20.0 | 4600 | −250 |
| 8 | 0.6 | 2.0 | 0.5 | 50.0 | 4600 | −100 |

TABLE 2

| LEVEL NO. | A-POWDER NO. | PARTICLE SIZE OF GRAPHITE(mm) | AMOUNT OF GRAPHITE PARTICLES (% BY VOLUME) | BUSHING TYPE |
|---|---|---|---|---|
| 1 | 1 | 0.3~1.5 | 10 | 1 |
| 2 | 1 | 0.3~1.5 | 20 | 1 |
| 3 | 2 | 0.3~1.5 | 10 | 1 |
| 4 | 2 | 0.3~1.5 | 40 | 1 |
| 5 | 3 | 0.3~1.5 | 20 | 1 |
| 6 | 4 | 0.3~1.5 | 40 | 1 |
| 7 | 5 | 0.3~1.5 | 40 | 2 |
| 8 | 5 | 0.3~1.5 | 50 | 2, 3 |
| 9' | 6 | 0.3~1.5 | 20 | 2 |
| 10' | 6 | 0.3~1.5 | 40 | 2 |
| 11 | 7 | 0.3~1.5 | 40 | 1 |
| 12 | 4 | 0.3~1.5 | 40 | 1 |
| 13 | 4 | 1.0~3.0 | 20 | 3 |
| 14 | 4 | 1.0~3.0 | 20 | 3 |
| 15 | 8 | 0.3~1.0 | 40 | 2 |

Figure 2A:
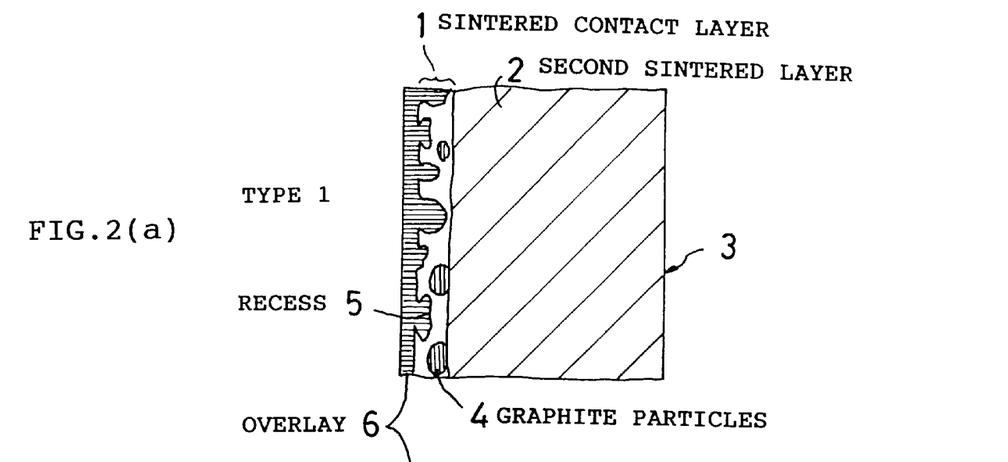
FIGS. 2(a), 2(b) and 2(c) depicts the partially enlarged cross sections of self-lubricating sintered sliding members according to the embodiment.
Figure 2B:
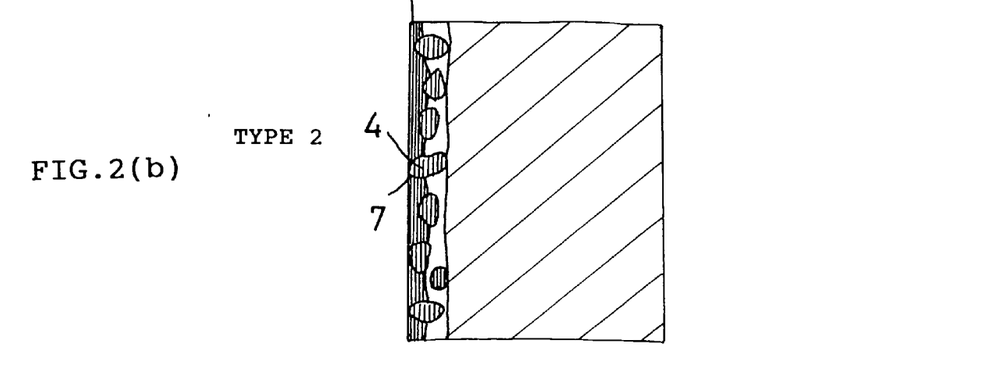
Figure 2C:
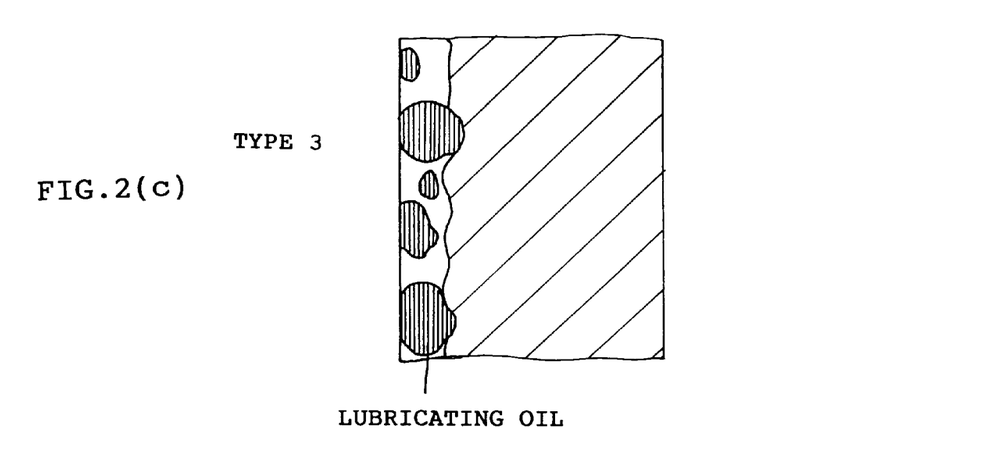

The sample bushings 3 are classified into four types (Type 1, Type 2, Type 2' and Type 3) according to the structures of their sintered contact layers (see FIG. 2).

[Type 1]

The sintered contact layer 1 into which graphite particles 4 had been mixed was molded and sintered. The graphite particles 4 projected from the surface of the sintered contact layer 1 which had been contracted by sintering. After the projecting graphite particles 4 had been removed by a mechanical means (e.g., sand blasting and shot peening) or chemical means (e.g., coning) to form recesses 5, an overlay 6 was formed over the surface of the sintered contact layer 1 and over the inner surfaces of the recesses 5. The overlay 6 was formed from a mixture (i.e., solid lubricant) of graphite and molybdenum disulfide which were mixed at a ratio of 1:1 and kneaded with a suitable amount of spindle oil. In the formation of the overlay 6, after the solid lubricant had been applied to the surface of the sintered contact layer 1, the overlay 6 was brought into close contact with the sintered contact layer 1 and its thickness was adjusted through coning (sizing), using a punch inserted into the bore of the bushing with an adjusted clearance. In order to achieve the effect of catching the solid lubricant, the preferable depth of the recesses 5 is 0.1 mm or more.

[Type 2]

Figure 3:
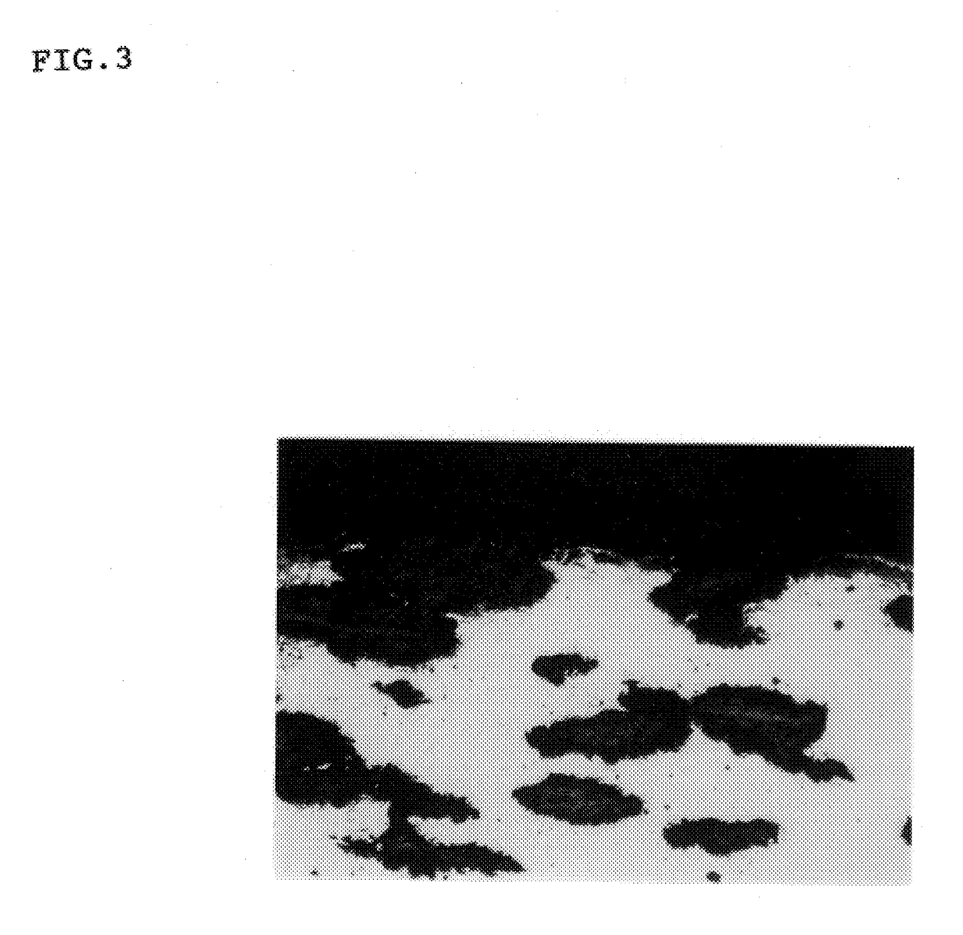
FIG. 3 is a photograph (50 magnifications) showing the profile of a sintered contact layer of Type 2.
Figure 4:
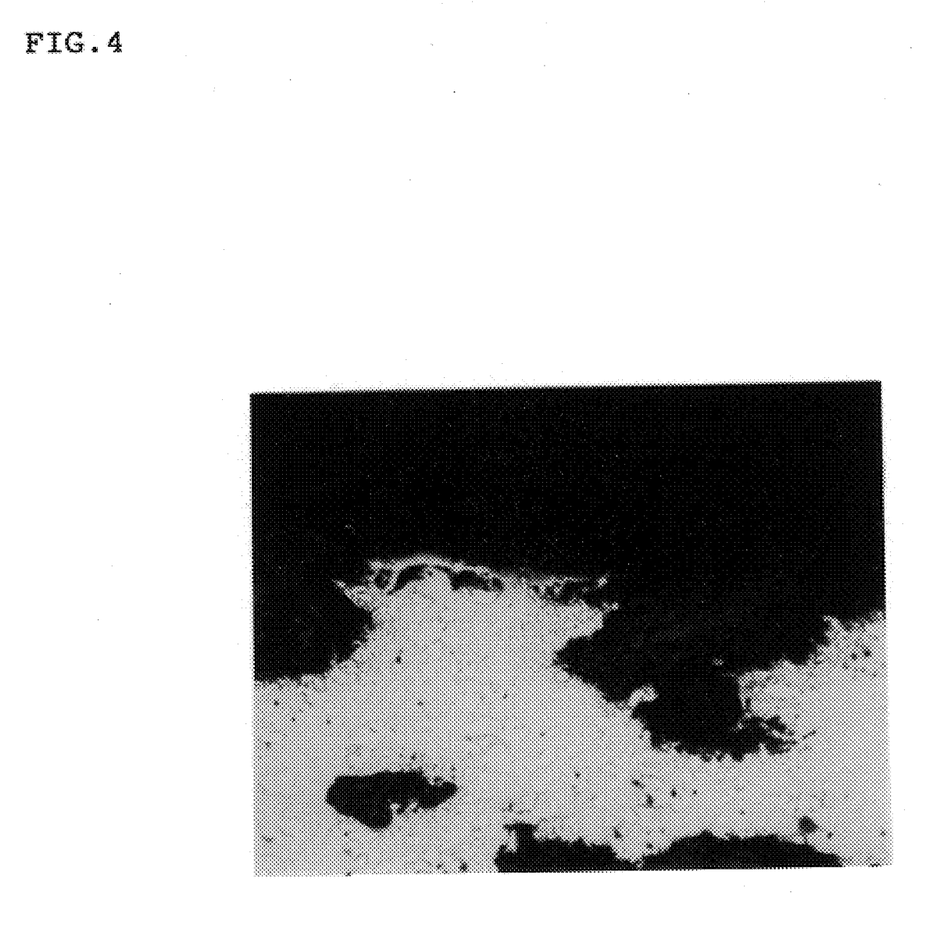
FIG. 4 is an enlarged photograph (100 magnifications) showing the profile of the sintered contact layer of Type 2 shown in FIG. 3.

While the graphite particles 4 projecting from the surface of the sintered contact layer 1 (see Type 1) being kept as protrusions 7, the overlay 6 was formed, similarly to the case of Type 1, from a mixture (i.e., solid lubricant) of graphite and molybdenum disulfide mixed at a ratio of 1:1 and kneaded with a suitable amount of spindle oil. The photographs of the profile of Type 2 are shown in FIG. 3 (50 magnifications) and FIG. 4 (100 magnifications). In these photographs, the white parts are the sintered contact layer 1. As seen from the photographs, masses of the graphite particles 4 (protrusions 7) project from the sintered contact layer 1 and are covered with the overlay 6 represented by the black part. In order to achieve the solid lubricant catching effect, it is preferable that the height of the protrusions 7 should be 0.1 mm or more.

[Type 2']

Type 2' is resemble to Type 2 except that no overlay is formed so that the graphite particles 4 constituting the protrusions 7 are exposed (Level 9' and Level 10' in Table 2).

[Type 3]

Oil impregnation treatment is applied to the sintered contact layer 1 using an synthetic fluid of phosphoric ester as a lubricating oil.

Figure 1B:
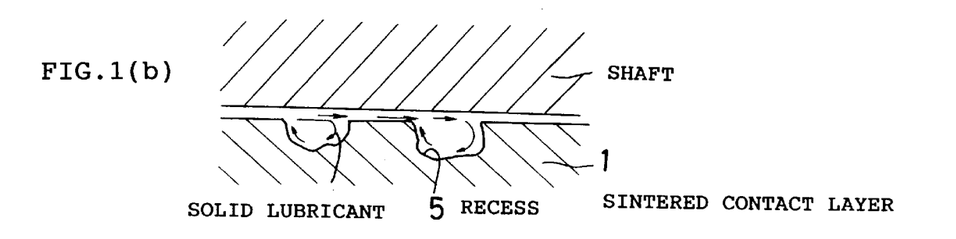

As has been described earlier, the structure of each sample bushings 3 is such that the sintered contact layer 1 made from the powder (A) is overlaid on the inner face of the second sintered layer (i.e., outer layer) made from the powder mixture (B) (see FIG. 1). In Types 1 and 2, the overlay 6 is formed on the inner surface of the sintered contact layer 1. The sintered contact layer 1 is diffusion-bonded to the second sintered layer 2 and the phase of the copper component of the sintered contact layer 1 is transformed to a liquid phase during sintering. Therefore, it is conceivable that the copper element is adsorbed by the second sintered layer 2. The adsorption of the copper element by the second sintered layer 2 and the presence of the copper element allow contraction of the sintered contact layer 1 and this contraction causes the graphite particles to project from the sintered contact layer 1 as described earlier.

(Embodiment 2)

In this embodiment, the function of the overlay (0.2 mm in thickness) and the effects of its composition were investigated. The sample bushings used in this embodiment were Level No. 7 (see Table 2) of Bush Type 2. The weight ratio of the components of each solid lubricant for forming the overlay is shown in Table 3. The components were blended at the respective ratios and kneaded to prepare the solid lubricants.

To form the overlay, methods of three types A, B and C were employed. In the method of Type A, the components of the solid lubricant were mixed and kneaded with the same grease (spindle oil) as disclosed earlier and the mixture was rubbed into the bore of the bushing. In the method of Type B, the components were mixed and kneaded with a thermosetting resin (phenol). The mixture was applied to the bore of the bushing and then hardened. According to the method of Type C, the components were mixed and kneaded with a thermoplastic resin (Nylon 12, L1700 produced by Dicel Corporation) and then applied to the bore of the bushing. In any case, an organic binder was contained in large mounts compared to other components for easy application of the overlay. Although the overlay is more likely to peel off during sliding, as the percentage of an organic binder increases, large amounts of an organic binder were used in this embodiment for the purpose of clearly understanding the holding ability of the overlay at the sliding surface.

Figure 5:
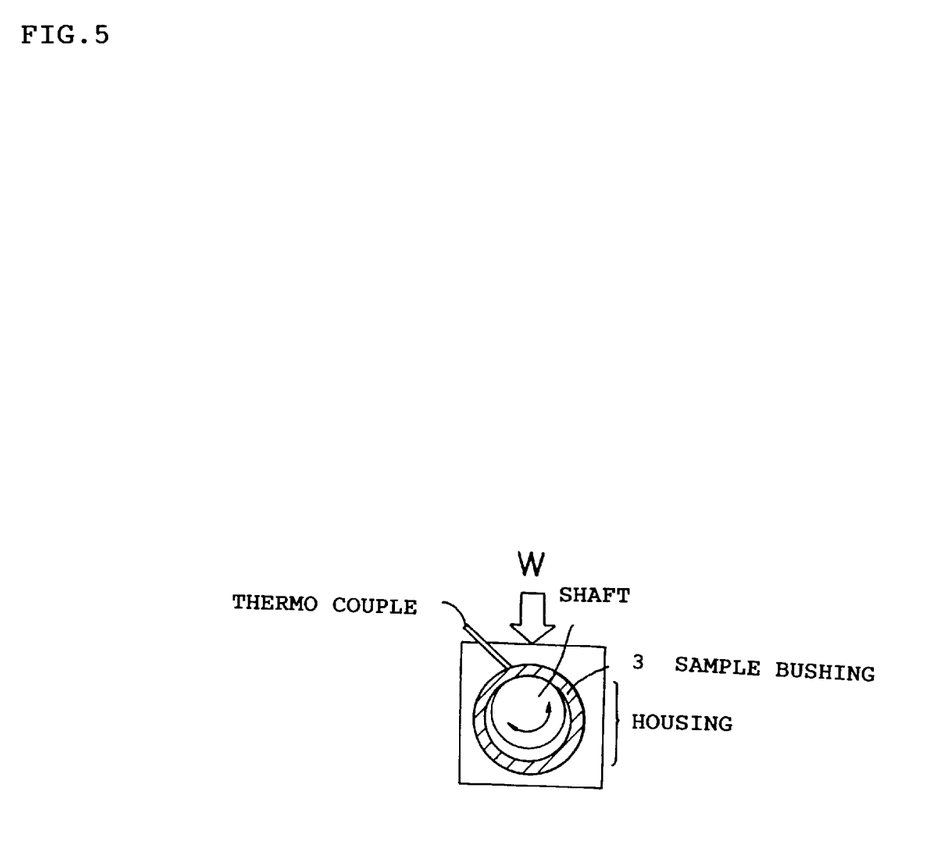
FIG. 5 schematically depicts a method for testing sample bushings prepared according to the embodiment.
Figure 6:
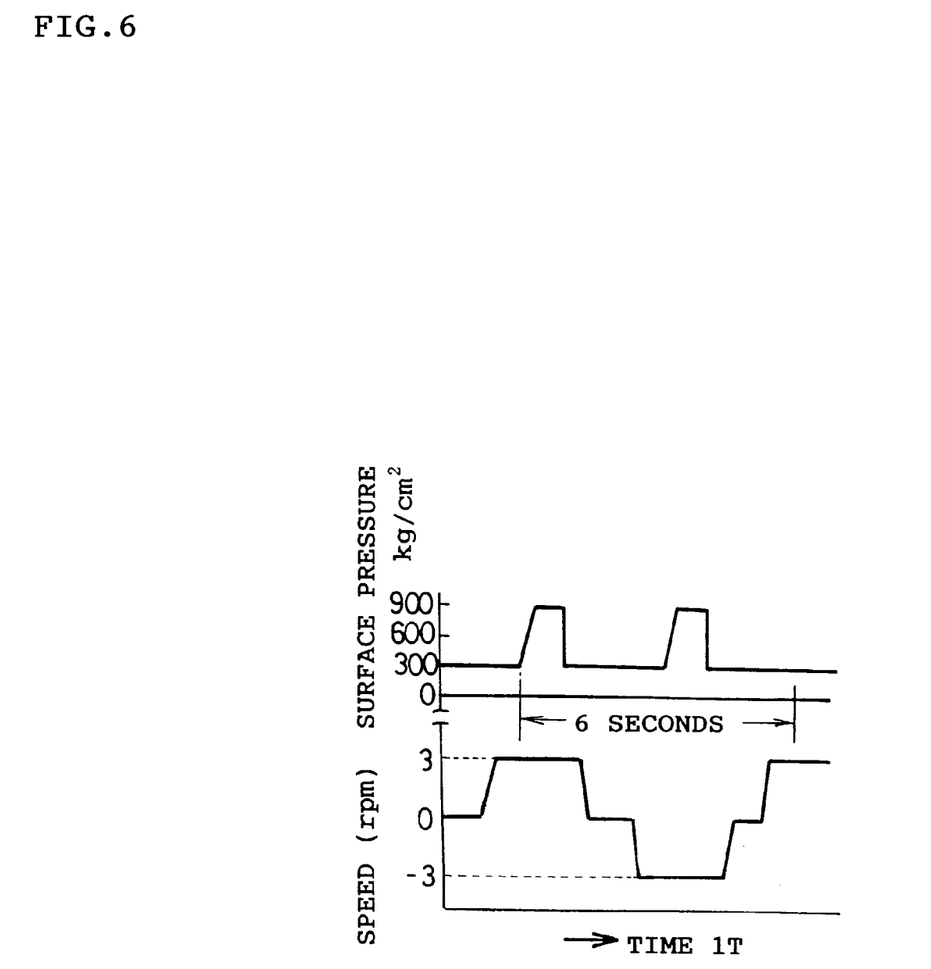
FIG. 6 is a graphical depiction of test conditions for the sample bushings shown in FIG. 5.
Figure 7:
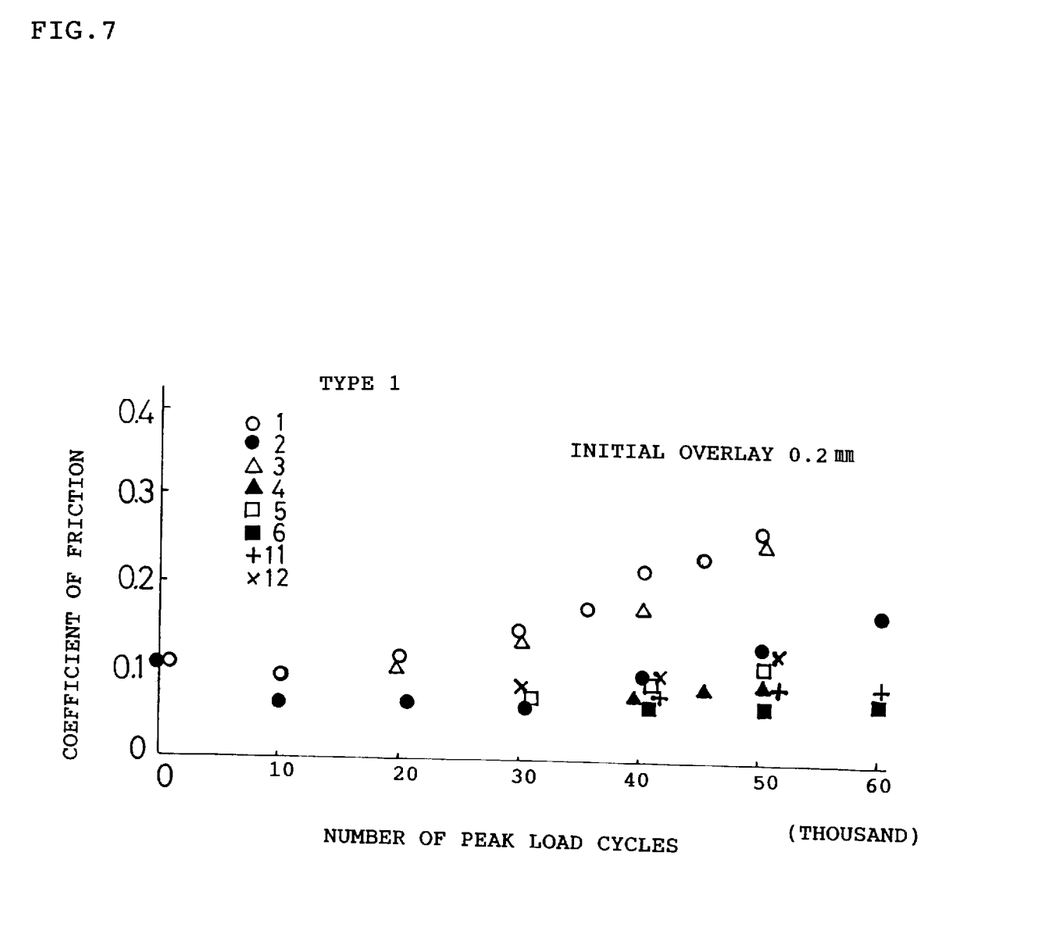
FIG. 7 is a graphical depiction of the wear resistance of the sample bushings prepared according to the embodiment.
Figure 8:
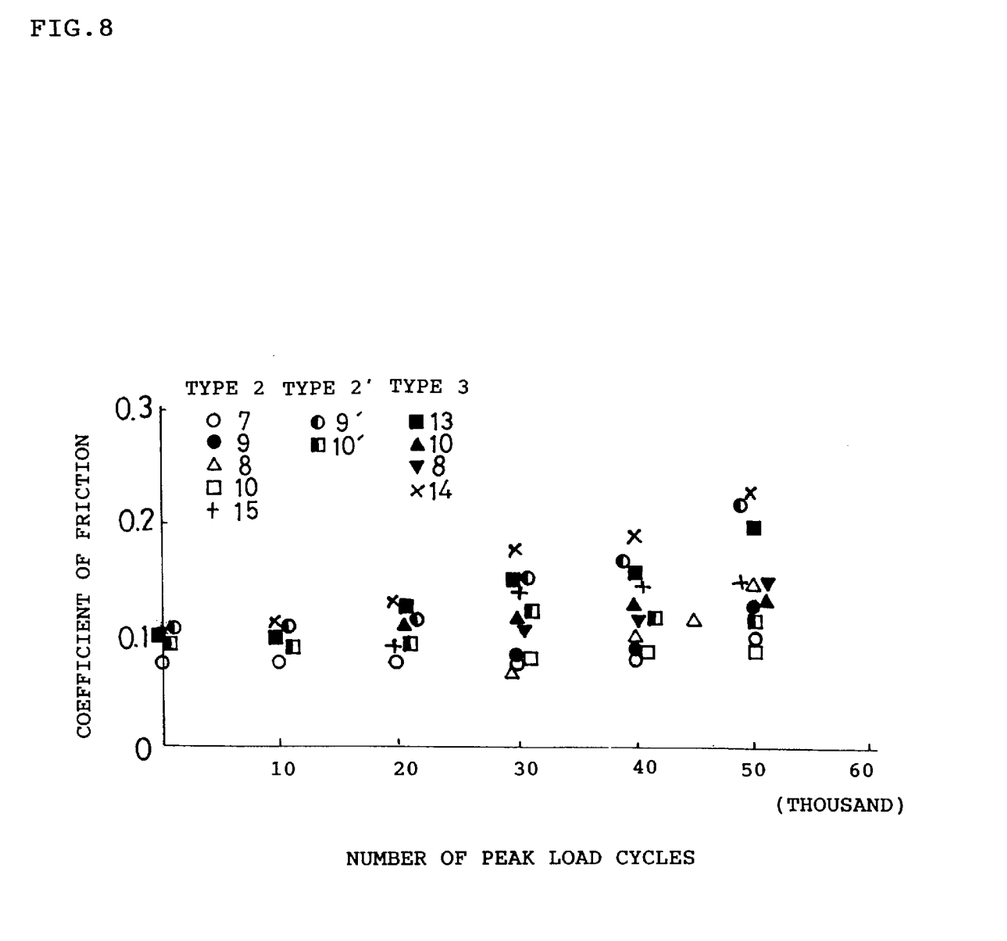
FIG. 8 is a graphical depiction of the wear resistance of the sample bushings prepared according to the embodiment.
Figure 9:
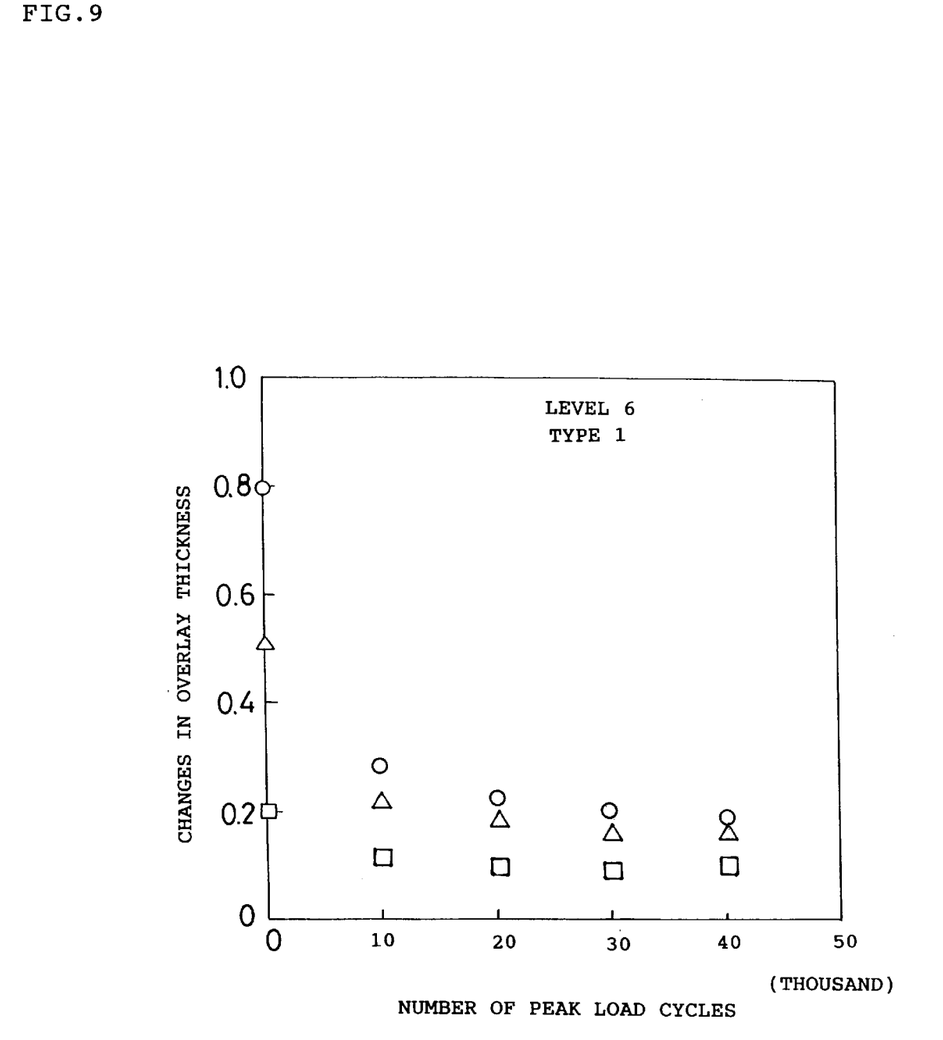
FIG. 9 is a graphical depiction of changes in the thickness of an overlay (solid lubricant layer) in the sample bushings.

Offset load having the pattern shown in FIG. 6 was applied to each sample bushings 3 tested on the testing machine shown in FIG. 5. Then, the relationship between the coefficient of friction, friction amount (=the thickness of the overlay) and the number of peak pressure cycles (see FIG. 6) was obtained. FIG. 7 shows the results of the tests conducted on the samples of Type 1 having the 0.2 mm-thick overlay 6. FIG. 8 shows the results of the tests conducted on the samples of Type 2 having the 0.2 mm-thick overlay 6, on the sample of Type 2' having no overlay and on the samples of Type 3. FIG. 9 shows the results of the tests conducted on the samples of Type 1 whose overlays 6 are 0.2 mm, 0.5 mm and 0.8 mm in thickness. Table 3 shows the result of the investigation conducted to survey the effects of the compositions of the overlay 6.

The following is the conditions of the tests conducted using the testing machine shown in FIG. 5.

Material of the shaft: S45C IQT
Test speed: 3 rpm
Test load: normal load=400 kg/cm$^2$
maximum load=900 kg/cm$^2$ It is understood from the results of the tests illustrated in FIGS. 7 and 8 that improved initial friction properties can be achieved by the application of the overlay 6 and that if graphite particles serving as the solid lubricant is contained in amounts of about 15% by volume or more, stable sliding properties can be ensured for long periods. If the amount of graphite particles exceeds 15% by volume, there is the danger of a decrease in strength. As seen from the results shown in FIG. 8, the use of a fine powder in forming the sintered contact layer contributes to an improvement in strength.

It will be understood from the results described above that high sintered density of the sintered contact layer (the degree of densification) is a critical factor and it is obvious for one skilled in the art that the same effect can be obtained by infiltration of copper-family materials.

It is conceivable from the results shown in FIG. 9 that the thicker the overlay 6, the more the overlay 6 is reduced in thickness as the test proceeds, and that when the thickness reaches around 0.2 mm, the changes in the thickness of the overlay 6 become less significant so that possible problems due to changes in the thickness of the overlay 6 can be avoided by adjusting the clearance between the pin (shaft) and the bushing. In reality, the thickness of the overlay is determined by an allowable clearance for the sliding member but should be 0.5 mm or less in view of the necessity and cost.

TABLE 3

| LEVEL | ORGANIC BINDER | GRAPHITE | MoS$_2$ | BN | Cu | Pb | Sn | Zn | SILICA | 5,000 | 10,000 | 40,000 | 500,000 | TYPE OF ORGANIC BINDER |
|---|---|---|---|---|---|---|---|---|---|---|---|---|---|---|
| (1) | 5 | 3 | | | | | | | | X | X | X | X | WAX |
| (2) | 5 | | | | | 10 | | | | | 0.110 | X | X | X | WAX |
| (3) | 5 | 3 | | | 3 | 10 | | | | | 0.120 | 0.118 | 0.132 | — | WAX |
| (4) | 5 | | 3 | | 3 | 10 | | | | | 0.100 | 0.116 | 0.120 | — | WAX |
| (5) | 5 | 3 | 3 | | 3 | 10 | | | | | 0.092 | 0.117 | 0.117 | — | WAX |
| (6) | 5 | 3 | 3 | | 3 | 10 | 5 | | | | 0.103 | 0.117 | 0.115 | — | WAX |
| (7) | 5 | 3 | 3 | | 3 | 10 | | 5 | | | 0.090 | 0.106 | 0.105 | 0.105 | WAX |
| (8) | 5 | 3 | 3 | | 3 | 10 | | | 1 | | 0.100 | 0.111 | 0.110 | 0.113 | WAX |
| (9) | 15 | 3 | 3 | | 3 | 5 | 5 | | | | 0.133 | X | X | X | PHENOL |
| (10) | 15 | | 3 | 3 | 3 | 5 | 5 | | | | X | X | X | X | PHENOL |
| (11) | 15 | 3 | 3 | | 3 | 5 | | 5 | | | 0.085 | 0.101 | 0.100 | 0.107 | PHENOL |
| (12) | 20 | 3 | 3 | | 3 | 5 | | 5 | | | 0.043 | 0.044 | 0.244 | 0.058 | NYLON 12 |
| (13) | 20 | 3 | 5 | | 4 | 5 | | 5 | 3 | | 0.060 | 0.059 | 0.061 | 0.065 | NYLON 12 |
| (14) | 10 | 3 | 3 | | 3 | 5 | | 5 | | | 0.057 | 0.057 | 0.059 | 0.062 | NYLON 12 |
| (15) | 1 | | | | | | | | | | 0.042 | 0.045 | X | — | NYLON 12 |
| COMPARATIVE EXAMPLE | SO#50SP2 PRODUCED BY SANKYO OILLESS INC. | | | | | | | | | 0.130 | 0.110 | X | X | |

*Coefficients of friction of 0.135 or more are considered to be attributable to no overlay effects and marked with X.

The overlay 6 contains not only the solid lubricant but also metal powders such as Cu, Pb, Sn and Zn which are soft and have little adhesion relative to iron. It will be understood from the results shown in Table 3 that the coexistence of such metal powders contributes to a considerable improvement in the holding ability of the overlay 6 at the sliding surface and the addition of Cu and Zn is particularly effective. When Cu was used, it was observed upon completion of the test that an extremely thin Cu film had been formed on the sliding surface. From this, it is conceivable that the metal powders and the solid lubricant contained in the overlay were mechanically alloyed at the sliding surface of the overlay, imparting excellent self-lubricity to the bushing. In cases where nylon 12 was used as the organic binder, the coefficient of friction is significantly small. This is presumably due to the fact that nylon 12 itself is a good contact material. As comparative examples, the drawing demonstrates the test result of a bushing in which the overlay 6 was formed from nylon 12 alone (Level (15)) and the test result of the above-described commercially available bushing in which a brass ingot was machined to form holes and the holes were filled with the solid lubricant (SO#50 SP2 produced by SANKYO OILLESS INC.). Regarding the bushing coated by nylon 12 alone, the test was suspended upon vanishing of the initial wear, but it is understood that the friction of the bushing rapidly increased to a degree equal to the coefficient of friction of the base material, immediately after the coating film had been worn out. Note that coefficients of friction of 0.135 or more are marked with x in Table 3, considering that the overlay exerts no effects.

While graphite particles are used as the solid lubricant particles in the foregoing embodiments, particles such as BN, $WS_2$, $MoS_2$, or $CaF_2$ may be used. Alternatively, two or more kinds of particles may be used, selecting from the group consisting of graphite, BN, $WS_2$, $MoS_2$, and $CaF_2$. However, graphite particles are the most suitable in view of cost and thermal stability. An auxiliary agent such as $B_2O_3$ and $MnO_2$ may be used in order to promote the lubricity of graphite particles. In cases where elements other than graphite such as $WS_2$ and $MoS_2$ are used as the solid lubricant, they react with the iron-family and copper-family materials during high-temperature sintering. Measures for inhibiting this reaction are disclosed in Japanese Applications No. 63-190994 (1988) and No. 2-14380 (1990) in which water glass or the like is used for coating the solid lubricant. Although these measured are useful, another effective measure is employed in the foregoing embodiments, in which an alloy powder or metal powder of Ti, Al, Ca, Zr or the like, which is more likely to form a sulfide than $WS_2$ and $MoS_2$, is added in a minute amount.

For comparison, the same overlay as that of Embodiment 1 was applied to the bore (no recesses and protrusions were formed) of an ordinary steel pipe and the same test was conducted. It was observed that the overlay was peeled from the sliding surface after 10,000 cycles of application of a peak load and seized in the cause of the later cycles. In contrast with this, no seizing is admitted and the desired wear resistance is ensured in the bushing (e.g., Type 1) prepared according to the invention, because even if the solid lubricant of the overlay is subjected to high load caused by a shaft as shown in FIG. 1(b), the solid lubricant can circulate within the recesses formed in the sintered contact layer so that the solid lubricant are caught by the recesses (i.e., anchoring effect) and consequently unlikely to be removed from the sliding surface. With this arrangement, the bushings according to the embodiment ensures high wear resistance and can be prevented from seizure.

In the self-lubricating sintered sliding member of the invention, the ability of the solid lubricant for being impregnated with an auxiliary lubricant oil can be improved by making the size (diameter) of the solid lubricant be about 0.5 to 2.0 times the thickness of the sintered contact layer. The particle diameter of the solid lubricant may be about 0.1 to 3.0 mm and the average particle diameter of other metal powder components used in the sintered contact layer may be about one eighth or less of the particle diameter of the solid lubricant. With this arrangement, the stress concentration due to the presence of the solid lubricant can be lessened and the probability of contact between the solid lubricant particles can be reduced.

In cases where the self-lubricating sintered sliding member of the invention is subjected to high load, the load is pseudo-hydrostatically, uniformly transmitted to the sintered sliding layer through the solid lubricant layer so that the high load can be prevented from being concentrated on the sintered contact layer. Another important factor is the holding ability of the solid lubricant layer by which it can remain on the sliding surface for a long time. This holding ability at the sliding surface can be markedly improved by impregnating metal powders such as Cu and Zn into the self-lubricating film (solid lubricant layer) serving as the overlay in addition to the solid lubricant such as graphite and $MoS_2$. Moreover, by virtue of the mechanical alloying effect achieved at the sliding surface, there is formed the self-lubricating film which has little probability to adhere to iron on the sliding surface so that stable friction characteristics can be achieved even if the self-lubricating sliding member is used under a sliding condition for a long time. In order to achieve the effect of a thickener and improved applicability to the sliding surface, the solid lubricant layer may contain an organic binder such as grease, nylon or phenol resin.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A self-lubricating sintered sliding member comprising an iron-family metal substrate and a sintered contact layer that is formed on a sliding side of the iron-family metal substrate and made from a sintered contact material containing an iron-family material, the sintered contact layer having, on a surface thereof, protrusions formed from solid lubricant particles, the surface of the sintered contact layer where the protrusions are formed being covered with a solid lubricant layer.

2. A self-lubricating sintered sliding member according to claim 1, wherein said protrusions are formed from the solid lubricant particles already contained in the sintered sliding layer and projecting from the surface of the sintered sliding layer.

3. A self-lubricating sintered sliding member according to claim 1, wherein the particle diameter of said solid lubricant particles ranges from 0.1 to 3.0 mm and said sintered contact layer contains 15 to 50% by volume of the solid lubricant particles.

4. A self-lubricating sintered sliding member according to claim 1, wherein said solid lubricant particles are one or more kinds of particles selected from the group consisting of graphite, BN, $WS_2$, $MoS_2$, and $CaF_2$.

5. A self-lubricating sintered sliding member according to claim 1, wherein said solid lubricant layer contains one or more known solid lubricants selected from the group consisting of graphite, BN, $WS_2$, $MoS_2$ and $CaF_2$, or alternatively contains a metal powder capable of reducing adhesion relative to iron and/or an organic binder in addition to one or more known solid lubricants selected from the group consisting of graphite, BN, $WS_2$, $MoS_2$ and $CaF_2$.

6. A self-lubricating sintered sliding member according to claim 5, wherein said metal powder capable of reducing adhesion relative to iron is a non-ferrous metal powder which has weak adhesion in relation to iron such as Cu, Zn, Pb, Bi, Sb, W and Mo.

7. A self-lubricating sintered sliding member comprising an iron-family metal substrate and a sintered contact layer formed on the iron-family metal substrate, the sintered contact layer having recesses formed on a surface thereof, the surfaces of the sintered contact layer and the recesses being covered with a solid lubricant layer.

8. A self-lubricating sintered sliding member according to claim 7, wherein said recesses are holes formed by removing solid lubricant particles already contained in the surface of the sintered contact layer.

9. A self-lubricating sintered sliding member according to claim 8, wherein the particle diameter of said solid lubricant particles ranges from 0.1 to 3.0 mm and the sintered contact layer contains 15 to 50% by volume of the solid lubricant particles.

10. A self-lubricating sintered sliding member according to claim 8, wherein said solid lubricant particles are one or more kinds of known solid lubricants selected from the group consisting of graphite, BN, $WS_2$, $MoS_2$ and $CaF_2$.

11. A self-lubricating sintered sliding member according to claim 1, wherein said sintered contact material contains a copper-family material in addition to the iron-family material.

12. A self-lubricating sintered sliding member according to claim 11, wherein said sintered contact material contains 10 to 80% by volume of the copper-family material.

13. A self-lubricating sintered sliding member according to claim 12, wherein said sintered contact material further contains carbon.

14. A self-lubricating sintered sliding member according to claim 13, wherein said sintered contact material contains 2.0 to 20.0 wt % of Ni and 0.5 to 10.0 wt % of one or more elements selected from the group consisting of Ti, Si, Al, Fe, Co, Cr, Zr and Sn.

15. A self-lubricating sintered sliding member according to any one of claims 2 to 14, wherein said sintered contact layer is densified to a degree of 90% or more.

16. A self-lubricating sintered sliding member according to any one of claims 2 to 6, wherein said sintered contact material contains an iron-family material ground into a fine powder of 250 mesh or less.

17. A self-lubricating sintered sliding member according to any one of claims 2 to 14, wherein the sintered contact layer is joined to the sliding side of the iron-family metal substrate by diffusion bonding.

18. A method of producing a self-lubricating sintered sliding member composed of an iron-family metal substrate and a sintered contact layer that is formed on a sliding side of the iron-family metal substrate and made from a sintered contact material containing an iron-family material, the sintered contact layer having a solid lubricant layer formed on a surface thereof, the method comprising the steps of:

forming protrusions on a surface of the sintered contact layer, and forming the solid lubricant layer on the surface of the sintered contact layer where the protrusions are formed.

19. A method of producing a self-lubricating sintered sliding member according to claim 18, wherein a copper-family material and solid lubricant particles are mixed into the sintered contact material containing the iron-family material and the sintered contact material mixed with the copper-family material and solid lubricant particles is sintered and contracted, whereby the solid lubricant particles are projected from the surface of the sintered contact layer to form the protrusions.

20. A method of producing a self-lubricating sintered sliding member according to claim 19, wherein the solid lubricant particles having a particle diameter ranging from 0.1 to 3.0 mm are used and the sintered contact layer contains 15 to 50% by volume of the solid lubricant particles.

21. A method of producing a self-lubricating sintered sliding member composed of an iron-family metal substrate and a sintered contact layer that is formed on a sliding side of the iron-family metal substrate and made from a sintered contact material containing an iron-family material, the sintered contact layer having a solid lubricant layer formed on a surface thereof, the method comprising the steps of:

forming recesses on a surface of the sintered contact layer, and forming the solid lubricant layer on the surface of the sintered contact layer where the recesses are formed.

22. A method of producing a self-lubricating sintered sliding member according to claim 21, wherein solid lubricant particles are mixed into the sintered contact material containing the iron-family material and after the sintered contact material mixed with the solid lubricant particles has been sintered, the solid lubricant particles are removed from the surface of the sintered contact layer, thereby forming the recesses.

23. A method of producing a self-lubricating sintered sliding member according to claim 22, wherein the solid lubricant particles having a particle diameter ranging from 0.1 to 3.0 mm are used and the sintered contact layer contains 15 to 50% by volume of the solid lubricant particles.

* * * * *